(12) United States Patent
Beard et al.

(10) Patent No.: US 10,606,580 B2
(45) Date of Patent: Mar. 31, 2020

(54) COGNITIVE IDENTIFICATION OF RELATED CODE CHANGES

(71) Applicant: International Business Machines Corporation, Armonk, NY (US)

(72) Inventors: Darren R. Beard, Chandler's Ford (GB); Jenny J. He, Chandler's Ford (GB); Andrew Wright, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/799,342

(22) Filed: Oct. 31, 2017

(65) Prior Publication Data
US 2019/0129704 A1   May 2, 2019

(51) Int. Cl.
| G06F 8/65 | (2018.01) |
| G06F 16/33 | (2019.01) |
| G06F 8/71 | (2018.01) |
| G06F 8/75 | (2018.01) |

(52) U.S. Cl.
CPC ............ *G06F 8/65* (2013.01); *G06F 8/71* (2013.01); *G06F 8/75* (2013.01); *G06F 16/3344* (2019.01)

(58) Field of Classification Search
None
See application file for complete search history.

(56) References Cited

U.S. PATENT DOCUMENTS

| 8,572,572 | B2* | 10/2013 | Morgan | G06F 8/51 717/125 |
| 9,262,134 | B2* | 2/2016 | Kelapure | G06F 8/40 |
| 2009/0276757 | A1* | 11/2009 | Lindvall | G06F 8/72 717/121 |
| 2012/0272207 | A1* | 10/2012 | Lerner | G06F 8/30 717/102 |
| 2015/0293762 | A1* | 10/2015 | Abuelsaad | G06F 8/70 717/120 |

(Continued)

OTHER PUBLICATIONS

Zimmermann, "Mining Version Histories to Guide Software Changes", 2005, IEEE Trans. Software Eng. 31, 429-445. (Year: 2005).*

(Continued)

*Primary Examiner* — Hossain M Morshed
(74) *Attorney, Agent, or Firm* — Scully, Scott, Murphy & Presser, P.C.; Margaret McNamara, Esq.

(57) ABSTRACT

The cognitive identification of related code changes is disclosed herein including receiving a set of changes for a software package that include changes to at least one program, analyzing data associated with the set of changes to identify a goal of the set of changes, querying a data repository for a pattern associated with the identified goal, and receiving, from the data repository, the pattern associated with the identified goal. The pattern includes at least one program to be changed for the identified goal. The method further including comparing the set of changes to the pattern, determining, based on the comparison, that at least one program included in the pattern is not changed in the set of changes, and transmitting a message to a computing device associated with a user that indicates that the at least one program included in the pattern is not changed in the set of changes.

20 Claims, 5 Drawing Sheets

(56) References Cited

U.S. PATENT DOCUMENTS

2017/0024311 A1* 1/2017 Andrejko ............ G06F 11/3672

OTHER PUBLICATIONS

Weise, "Using contextual information to predict co-changes", 2016, The Journal of Systems and Software journal. homepage: www.elsevier.com/locate/jss (Year: 2016).*

Zimmermann, "Mining Version Histories to Guide Software Changes", 2005, IEEE Trans. Softw. Eng. 31, 429-445. (Year: 2005).*

Wiese, I.S., et al.,"Using contextual information to predict co-changes", The Journal of Systems and Software 000, Jul. 15, 2016, 16 pages.

* cited by examiner

COGNITIVE IDENTIFICATION OF RELATED CODE CHANGES

BACKGROUND

The present disclosure relates to improvements in the identification of additional code changes that may be necessary when updating software for a target goal.

Making some types of changes to a complex software product often requires multiple related code changes to a number of related software programs or modules. For example, adding a new start up parameter or new statistics fields may necessitate multiple programs or modules being changed. Making such a change often requires a deep technical knowledge of the complete set of changes that will be required for a particular piece of software. For a long lived software product, which may be in use by downstream users for multiple years or even decades, retaining skilled software developers or coders with deep technical knowledge of the software product is always a challenge. For example, on a long lived software product, the original software developers or coders that created the product may no longer be available to assist in identifying the additional software changes that may be necessary to implement a particular code change.

One common way that may be utilized in an attempt to retain the knowledge of code relationships in a software product is the use of robust documentation by the subject matter expert, e.g., the coder developing or modifying each piece of code. Unfortunately, such documentation is often out of date or incomplete.

In addition, some portions of a software product may not require any changes for a long period of time. Since the individual coders do not make changes in these portions frequently it is often easy for them to overlook one or more corresponding programs or modules which may also need to be changed due to their unfamiliarity with these portions of the software product. This lack of familiarity may result in defects or bugs being introduced into the product which may subsequently require substantial effort to identify, diagnose, and correct.

BRIEF SUMMARY

The system, method, and computer program product described herein provide for cognitive identification of related code changes.

In an aspect of the present disclosure, a method is disclosed including receiving a set of changes for a software package that include changes to at least one program, analyzing data associated with the set of changes to identify a goal of the set of changes, querying a data repository for a pattern associated with the identified goal, and receiving, from the data repository, the pattern associated with the identified goal. The pattern includes at least one program to be changed for the identified goal. The method further including comparing the set of changes to the pattern, determining, based on the comparison, that the at least one program included in the pattern is not changed in the set of changes, and transmitting a message to a computing device associated with a user that indicates that the at least one program included in the pattern is not changed in the set of changes.

In another aspect of the present disclosure a method is disclosed including receiving a set of changes for a software package that include changes to a plurality of programs, comparing the set of changes to a plurality of patterns stored in a data repository and associated with the software package, identifying, based on the comparison, a pattern in the plurality of patterns that matches the set of changes, comparing at least one program included in the matching pattern to the plurality of programs in the set of changes, and determining, based on the comparison, whether the match is a complete match. In a case where it is determined that the match is a complete match, the method further includes implementing the set of changes in the software package. In a case where it is determined that the match is not a complete match, the method further includes transmitting a message to a computing device associated with a user that submitted the set of changes, the message indicating that the match is not a complete match.

In another aspect of the present disclosure a method is disclosed including receiving a query from a computing device associated with a user that requests an identification of at least one program of a software package to be changed to meet a goal, querying a data repository for at least one pattern associated with the software package corresponding to the goal, receiving from the data repository a pattern corresponding to the goal in response to the query where the pattern includes at least one program required to be changed for the goal, and transmitting the at least one program required to be changed for the goal to the computing device associated with the user for presentation to the user.

In aspects of the present disclosure, apparatus, systems, and computer program products in accordance with any of the above aspects may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

The need to identify additional software related changes that may need to be made may be solved, in some aspects, by automatically recognizing a set of changes as achieving a particular goal such as, e.g. adding a new initialization parameter or new statistics. Accumulated knowledge about which common programs are often changed to achieve that goal may then be applied to determine what additional programs may require changes.

For example, when a user such as, e.g., a software developer, coder, or other similar user, attempts to finalize or deliver a set of code changes, the system may analyze a goal for the set of code changes, compare the set of code changes with the code changes made by others for the same or similar goal, and notify the user of any programs that the user has not changed but which may require changes based on the comparison. In some aspects, the system may also suggest a set of programs to change in order to achieve a particular goal.

Figure 1:
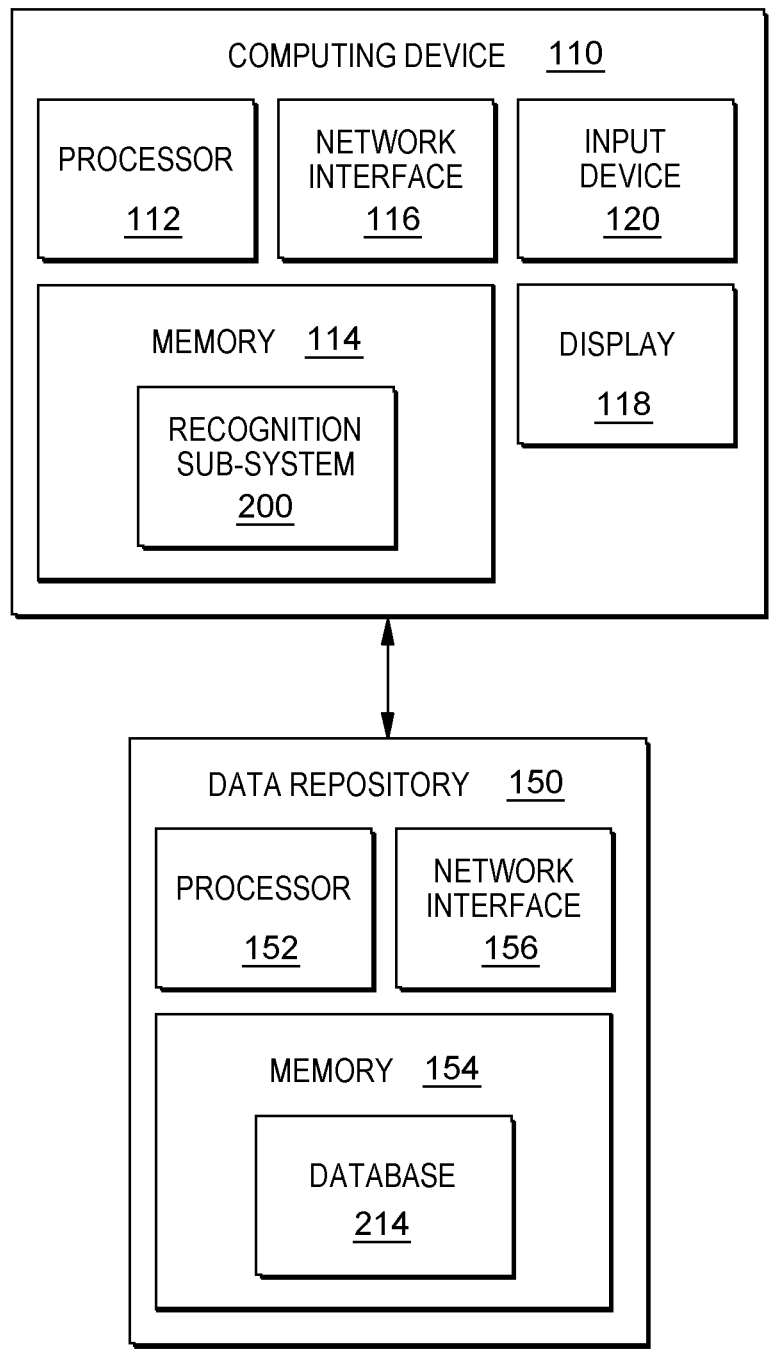
FIG. 1 is a system diagram illustrating a system for cognitive identification of related code changes in accordance with some aspects of the present disclosure.

With reference now to FIG. 1, a system 100 for identifying related code changes is illustrated. In some aspects, system 100 includes a computing device 110, and a data repository 150.

Computing device 110 includes at least one processor 112, memory 114, at least one network interface 116, a display 118, an input device 120, and may include any other features commonly found in a computing device. In some aspects, computing device 110 may, for example, be a computing device associated with a user that is configured to present the user with one or more potential changes that may be required. In some aspects, computing device 110 may include, for example, a personal computer, laptop, tablet, smart device, smart phone, smart watch, or any other similar computing device that may be used by a user. For example, in some aspects computing device 110 may be a device associated with coder or developer for use in developing new software.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a server 150 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from data repository 150.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Data repository 150 includes a processor 152, memory 154, and a network interface 156 that may include similar functionality as processor 112, memory 114, and network interface 116. In some aspects, data repository 150 may include, for example, any computing device, server, or similar system that is configured to interact with or provide data to computing device 110. For example, data repository 150 may be a code repository storing the code programs of a software package, tracking versions of each program or module, or performing any other function that may be required to monitor, control, and implement software development of the software product. In some aspects, for example, the software package may be a collection of components, e.g., programs, containing one or more lines of code, that together perform a function. In some aspects, for example, a program may be a module, sub-routine, or file containing one or more lines of code.

System 100 is configured to recognize a set of required programs that are related to a certain type of code change or goal. A goal may include, for example, the addition or removal of a particular input or output parameter, a change to the functionality of one or more aspects of the software package, or other similar goals. In some aspects, for example, the goal may include any desired change to the software package. As an example, a goal for a set of code changes may be the modification, addition, or removal of a particular startup parameter, statistic to be monitored, or other similar parameter, correction of a defect or bug in the software package, modification of a particular function within the software package such as, e.g., flight controls, fault detection, error handling, user interface, etc., or any other targeted change to the software package that may be implemented by a developer or coder.

In some aspects, for example, system 100 may analyze one or more items of documentation associated with a set of code changes to extract a goal of the set of code changes. A set of code changes may include changes to one or more programs that have been made by the developer or coder.

Items of documentation may include, for example, a work item, title of the change, comments in a code change, or any other item of documentation may be analyzed to extract a goal of the code change. For example, the work item may be a bug report, change instruction, or other similar documented item that indicates why a particular change is being made or provides an instruction to a user, e.g., developer, coder, etc., to make a change.

In some aspects, the comments associated with the change may also be leveraged to determine the goal of the change. For example, where the change instruction may state that a new parameter is being added to the code. The comments for the change may also state that new parameter "x" is being added according to the change instruction. This information may be extracted as a context of the code change and utilized to determine the goal of the change.

In some aspects, these items of documentation may be analyzed, for example, using natural language processing, keyword searching, string parsing, or other similar techniques. In some aspects, for example, IBM Watson® may be leveraged to analyze the natural language of the items of documentation to extract the context or goal of the items of documentation. In some aspects, keywords within the items of documentation may be analyzed or parsed, e.g., using a string search, and may be compared or matched to keywords stored in a list where each keyword in the list is associated with one or more goals. In some aspects, the user may mark the goal of the changes manually. For example, a drop down menu of available goals may be provided to the user, e.g., via display 118, from which the user may select a goal, e.g., using input device 120.

In some aspects, the set of code changes that are delivered or associated with a work item (e.g. an IBM Rational Team Concert (RTC) story, a defect report, etc.) may be marked with the type of change or goal. A work item, for example, may be a change ticket, support ticket, defect ticket, bug ticket, or other similar item from which the developer or coder generates a set of code changes for the software package. For example, the work item may be any item that triggers the developer or coder's changing of one or more programs in the software package.

In some aspects, the set of code changes may be compared with historical code changes that are identified as having the same goal and common modules between the set of code changes and historical code changes may be extracted to determine whether the relevant modules have been changed. For example, the specific programs being changed by the set of code changes may be compared to the programs changed by the historical code changes to determine whether any of the modules changed by the historical code changes have not been changed.

In some aspects, the set of code changes may be compared to historical code changes to determine whether the set of code changes matches a particular historical code change. For example, if the set of code changes includes one or more programs that were not changed in a particular historical code change, the particular historical code change may not be an appropriate code change to compare to the set of code changes.

Figure 2:
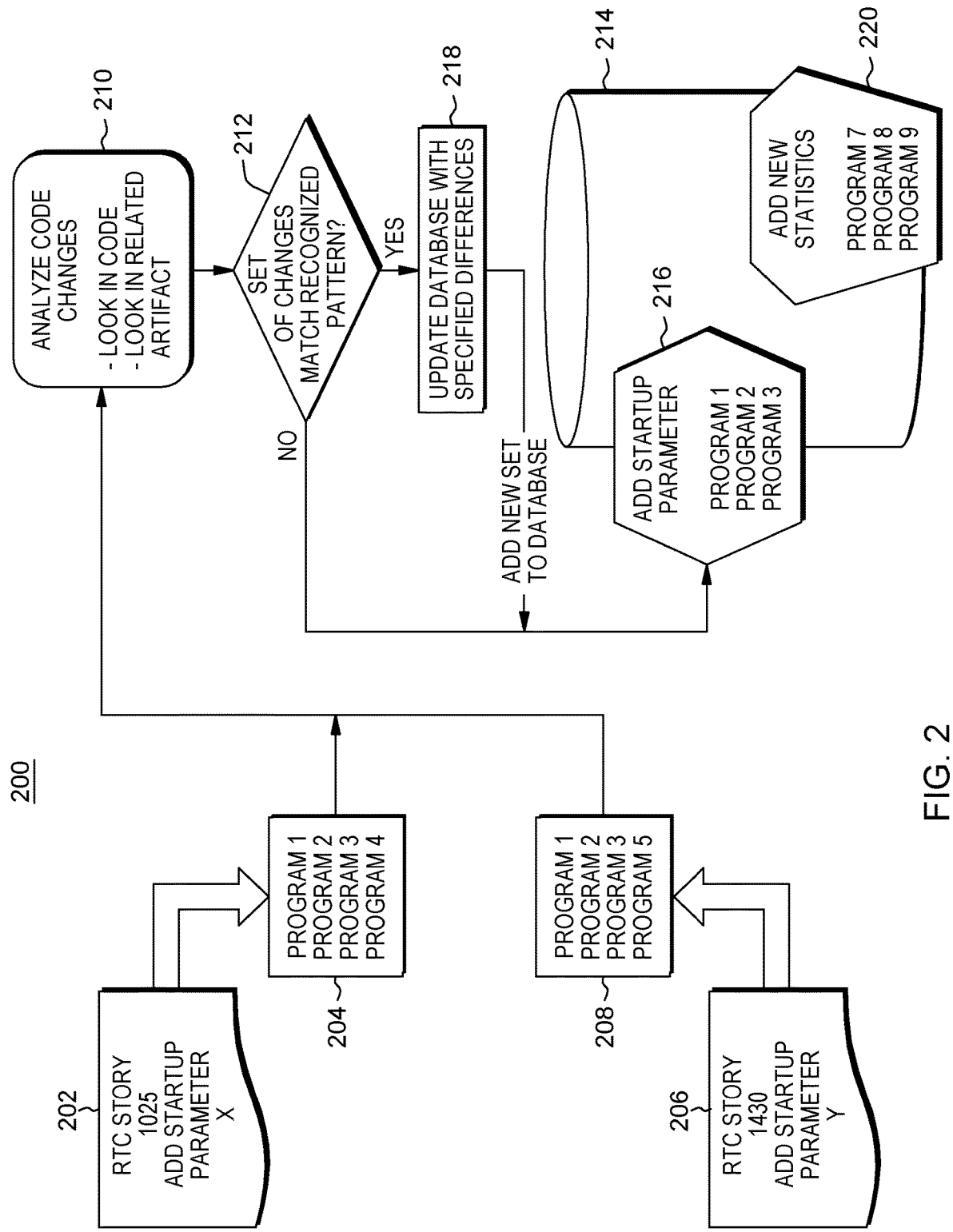
FIG. 2 is a flow chart of a method for using a recognition sub-system to perform cognitive identification of related code changes in accordance with some aspects of the present disclosure.

Referring now to FIG. 2, a recognition sub-system 200 is disclosed. Sub-system 200 may, for example, be a software package or code module stored in memory 114 of computing device 110 or in memory 154 of data repository 150 and executable by computing device 110. At 202, sub-system 200 analyzes the description and change comments for a work item 1025 (e.g. from an RTC story) in a library system such as RTC and determines that the goal of a set of changes 204 with changes to programs 1, 2, 3 and 4 is to add a new startup parameter, e.g., a parameter "X".

At 206, the sub-system 200 also analyzes the description and change comments for a work item 1430 (e.g. from an RTC story) and determines that it has the same type of goal, e.g., to add a new startup parameter, but for a parameter "Y". The set of changes 208 made by work item 1430 includes changes to programs 1, 2, 3, and 5.

At 210, the sub-system 200 analyzes each set of changes 204 and 208 and each work item 1025 and 1430, for example, by examining the work item, code changes, and related artifacts or documentation associated with the changes or work items. For example, sub-system 200 may determine which programs have been changed for each work item.

At 212, the sub-system 200 compares each set of changes to one or more patterns stored in a database 214 that are associated with the determined type of goal. Database 214 may be stored, for example, as part of data repository 150 or may be stored in memory 114. A pattern may include, for example, one or more programs that are associated with the goal. For example, a pattern may identify one or more programs that are commonly changed by a developer or coder when implementing the associated goal. In some aspects, the patterns found in database 214 for the software package may be specific to the software package. For example, a first software package may have a first set of patterns while a second software package may have an entirely different second set of patterns. For example, each pattern may be tailored specifically to the programs and functionality of a particular software package. In some aspects, for example, where an overlap between programs is present between the two software packages, some patterns may be included in association with both software packages.

In some aspects, for example, the set of changes may be compared to the patterns to determine whether there is a matching pattern of the same type of goal, e.g., adding a new startup parameter. For example, a list of programs being changed may be compiled for each set of changes 204 (i.e., programs 1, 2, 3, and 4) and 208 (i.e., programs 1, 2, 3, and 5). Each list of programs may be compared to a list of programs identified by a pattern stored in database 214, e.g., programs 1, 2, and 3 for pattern 216 which is associated with the goal "add startup parameter". If the changes match a recognized pattern, e.g., the list of programs being changed for the work item are the same as the list of programs found in the pattern, the changes may be stored in database 214. For example, in some aspects, patterns may have a weighting or significance value that may be increased if the pattern is found to occur many times during changes to the software package. If a pattern is rarely seen, the weighting or significance may be reduced because that pattern may not be as useful as the pattern which is regularly seen. As an example, in some aspects, matching may prioritize a pattern having a higher weighting or significance value over a pattern having a lower weighting or significance value.

If the list of programs changed for the work item do not match the list of programs found in a recognized pattern, e.g., there are additional programs in the list of programs being changed, sub-system 200 may mark the matching programs 1, 2, and 3 as common modules for the goal of adding a new startup parameter, and may mark programs 4 and 5 respectively as specific modules for adding each respective parameter "X" and "Y" at 218. This change information may be stored in database 214, e.g., in memory 154 of data repository 150, and pattern 216 for the goal of adding a startup parameter including this change information may be added to the database as a new pattern.

Similarly, when a set of changes for the goal of adding a new statistic, e.g., an output parameter, are added to the software package, the sub-system 200 may store a new pattern 220 for the goal of adding new statistics including associated common modules of programs 7, 8, and 9 in the database. Any other changes, additions, or deletions to one or more variables, programs, etc. of the software package may be analyzed in a similar manner.

In some aspects, the database may also be pre-loaded manually with a set of change patterns which are known to be related to a particular goal for use during the comparison at 212.

Figure 3:
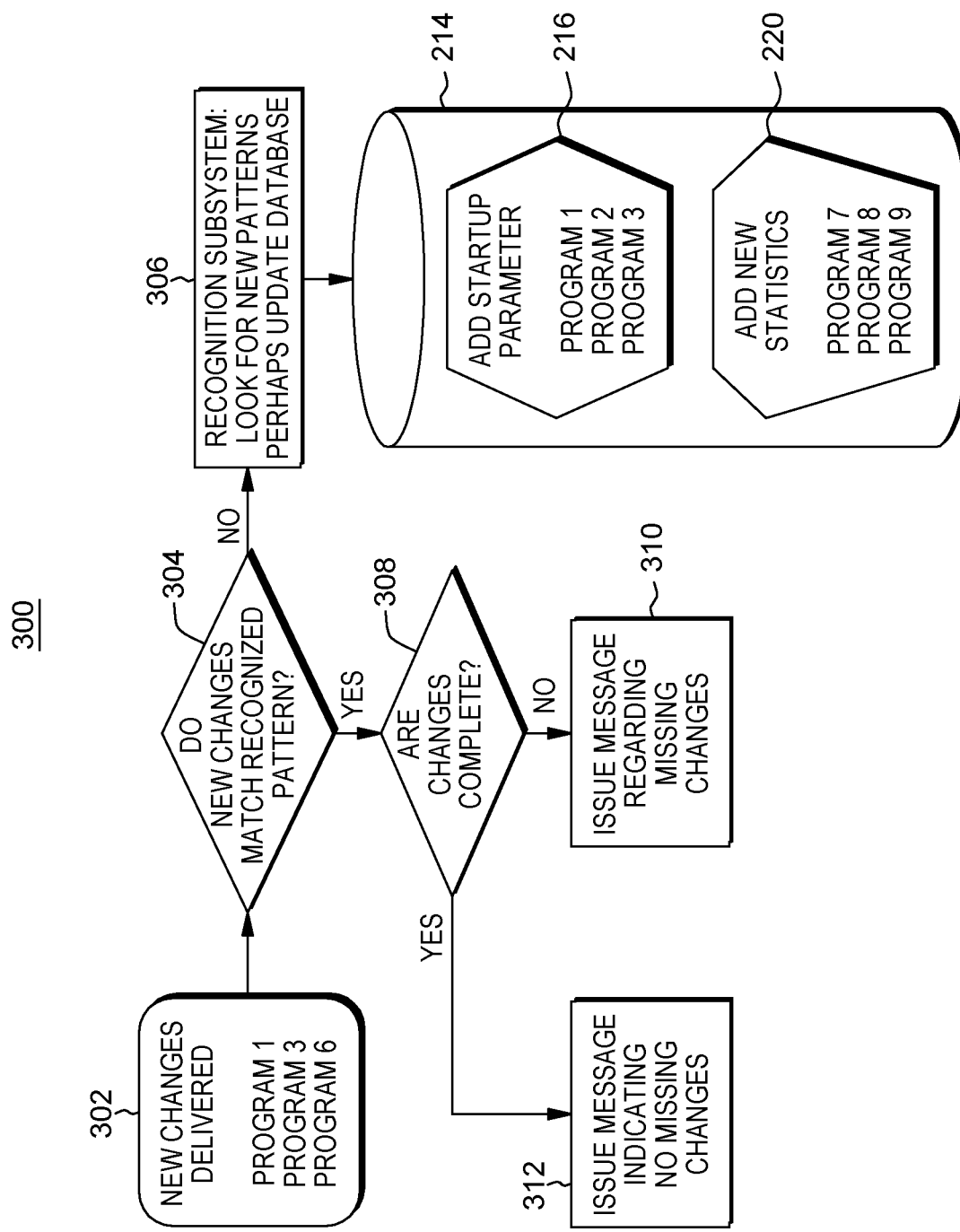
FIG. 3 is a flow chart of another method for using a recognition sub-system to perform cognitive identification of related code changes in accordance with some aspects of the present disclosure.

With reference now to FIG. 3, a method 300 performed by recognition sub-system 200 may also analyze a delivered set of code changes 302, e.g., changes to programs 1, 3, and 6, to determine whether the set of code changes 302 contains some or all of the programs found in a known pattern, e.g., known to belong in a historic or pre-determined set of code changes. If the set of code changes 302 is missing any particular programs that are commonly part of the pattern, the sub-system 200 may issue a message to alert a coder or developer, e.g., via a pop-up on display 118, an e-mail, text message, or other similar message, that it is likely that other programs found in the pattern may also require changes.

For example, the coder may deliver a set of changes 302 including changes to programs 1, 3 and 6 to the system. At 304, the recognition sub-system 200 may compare the programs found in the set of changes 302, e.g., programs 1, 3, and 6, against the sets of programs found in each known pattern, e.g., found in data repository 150. Recognition sub-system 200 may determine based on the comparison whether the set of changes 302 matches any of the known patterns. For example, recognition sub-system 200 may determine whether any of the programs in the set of changes 302 includes any of the programs found in each of the known patterns and may determine a proportion or percentage of the matching programs. The determined proportion or percentage may be compared to a pre-determined threshold proportion or percentage to determine whether there is a match between the set of changes 302 and the respective known pattern.

As an example, the changes to programs 1, 3, and 6 may have a 66% match against the pattern for adding a new startup parameter, i.e., two of three required programs, and a 0% match against the pattern for adding new statistics. As an example, the pre-determined threshold may be 60%. Any other percent or proportion may be used. Since 66% is greater than or equal to the pre-determined threshold of 60%, the set of changes 302 may be determined to match to the pattern for adding a new startup parameter. Also since 0% is less than the pre-determined threshold of 60%, the pattern for adding new statistics may be determined to not match the set of changes 302.

In some aspects, for example, the determination of a match may be uni-directional. For example, in some aspects, whether a match is determined may be based on a determination of whether the set of programs found in the pattern are found in the set of changes but not vice versa. For example, for a uni-directional match, if the pattern includes programs 1, 2, and 3 and the set of changes includes programs 1, 2, 3, 4, 5, and 6, a 100% match may be determined because the set of changes includes every program found in the pattern, i.e., programs 1, 2, and 3.

In some aspects, for example, the determination of a match may be bi-directional. For example, in some aspects, whether a match is determined may be based on a determination of whether the set of programs found in the pattern match the set of programs found in the set of changes. For example, for a bi-directional match, if the pattern includes programs 1, 2, and 3 and the set of changes includes programs 1, 2, 3, 4, 5, and 6, a 50% match may be determined because while the set of changes includes every program found in the pattern, i.e., programs 1, 2, and 3, the pattern only includes half of the programs found in the set of changes, i.e., programs 1, 2, and 3, but not programs 4, 5, and 6.

Referring again to FIG. 3, because the match is not 100%, i.e., set of changes 302 includes programs 1, 3, and 6 while pattern 216 includes programs 1, 2, and 3, there may be one or more programs of pattern 216 that are missing from the set of changes 302 and at 308, recognition sub-system 200 may compare the programs in the set of changes 302 to determine whether there are programs from the pattern 216 that have not been changed in the set of changes 302. If there are programs that have not been changed, recommender sub-system 200 may issue a message to the user at 310, e.g., via a messaging tool, via display 118, or in another similar manner, including an indication that one or more additional programs found in the change pattern may also require changes if the set of changes 302 is intended to add a new startup parameter. For example, pattern 216 for adding a startup parameter includes programs 1, 2, and 3. A comparison of the programs 1, 2, and 3 from pattern 216 to the programs being changed by the set of changes 302, e.g., programs 1, 3, and 6, shows that program 2 is missing from the set of changes 302 while program 6, which is not found in the pattern 216, may be considered a specific module for the set of changes 302. Recognition sub-system 200 may then issue the message at 310 indicating that the user should also consider making a change to program 2 based on the matched pattern 216.

If the list of programs being changed by the set of changes 302 includes all of the programs found in the known pattern, e.g., set of changes 302 includes 100% of the programs found in the known pattern, a message may be issued to the user at 312, e.g., via a messaging tool, via display 118, or in another similar manner, indicating that no changes are missing. For example, if set of changes 302 included program 2 in addition to programs 1, 3, and 6, a 100% match (uni-directional) between the programs found in pattern 216 and the set of changes 302 may be determined, i.e., that both contain programs 1, 2, and 3 with set of changes 302 also including the additional specific program 6. In some aspects, no message may be presented to the user to indicate that no changes are missing and instead the set of changes 302 may be accepted for addition to the software program.

Returning to 304, if the programs in the set of changes 302 do not match any recognized pattern, for example, if the comparison between the programs in the set of changes 302 and the programs in each known pattern do not provide a match above a pre-determined threshold, recognition sub-system 200 may be called as described above with reference to FIG. 2 to look for new patterns and update the database 214 at 306, for example, by adding pattern 216 as a new pattern for adding a startup parameter, adding a new pattern 220 for adding new statistics, or adding another pattern for another goal, as described above. For example, the lack of a match above a pre-determined threshold may indicate a poor fit to any known pattern and therefore may be a new pattern for addition to data repository 150.

In some aspects, the set of changes that does not match a known pattern may be stored in database 214 or memory 114 for later use. For example, a new pattern may be generated for a goal only after a pre-determined number of the same or similar set of changes has been received which do not match known patterns. For example, if the pre-determined number is five, five of the same or similar sets of changes for a particular goal, e.g., as extracted by recognition sub-module 200, may be required before the set of changes is added as a pattern for that goal.

In some aspects, in addition to the pre-determined threshold described above, a minimum pre-determined threshold may also be used to determine whether there is a poor fit. For example, if the match percentage or proportion is below a minimum pre-determined threshold of 5% or 10%, the match may be determined to be a poor fit. In some aspects, no message will be issued to the user regarding the lack of a match and data repository 150 may be updated to include a new pattern having the programs found in the set of changes for future comparisons. In some aspects, the new pattern may also be associated with a goal of the set of changes which may be identified as described above with reference to FIG. 2.

In some aspects, the pre-determined threshold, may be set by the system or adjusted by a user. For example, the thresholds may be set based on a size of the software package, number of known patterns, or any other context. For example, large software packages with a large number of programs and patterns may have higher pre-determined thresholds than small software package having a fewer number of programs and patterns. In some aspects, the pre-determined threshold may be adjusted increased or decreased in proportion to the number of programs or patterns in a software package.

In some aspects, when a new pattern is added to database 214 as described above, a message may be presented to the user, e.g., via computing device 110, giving the user the option to manually define and name the pattern. For example, the user may name the pattern, add or remove programs from the pattern, designate programs as common programs or specific programs within the pattern, delete or deny entry of the pattern to the database 214, or take any other action on the pattern. Absent the user's input, the pattern may be automatically added to the database 214 under a pre-defined naming criteria, e.g., as a generically named pattern, named based on the extracted goal, or in any other manner.

Figure 4:
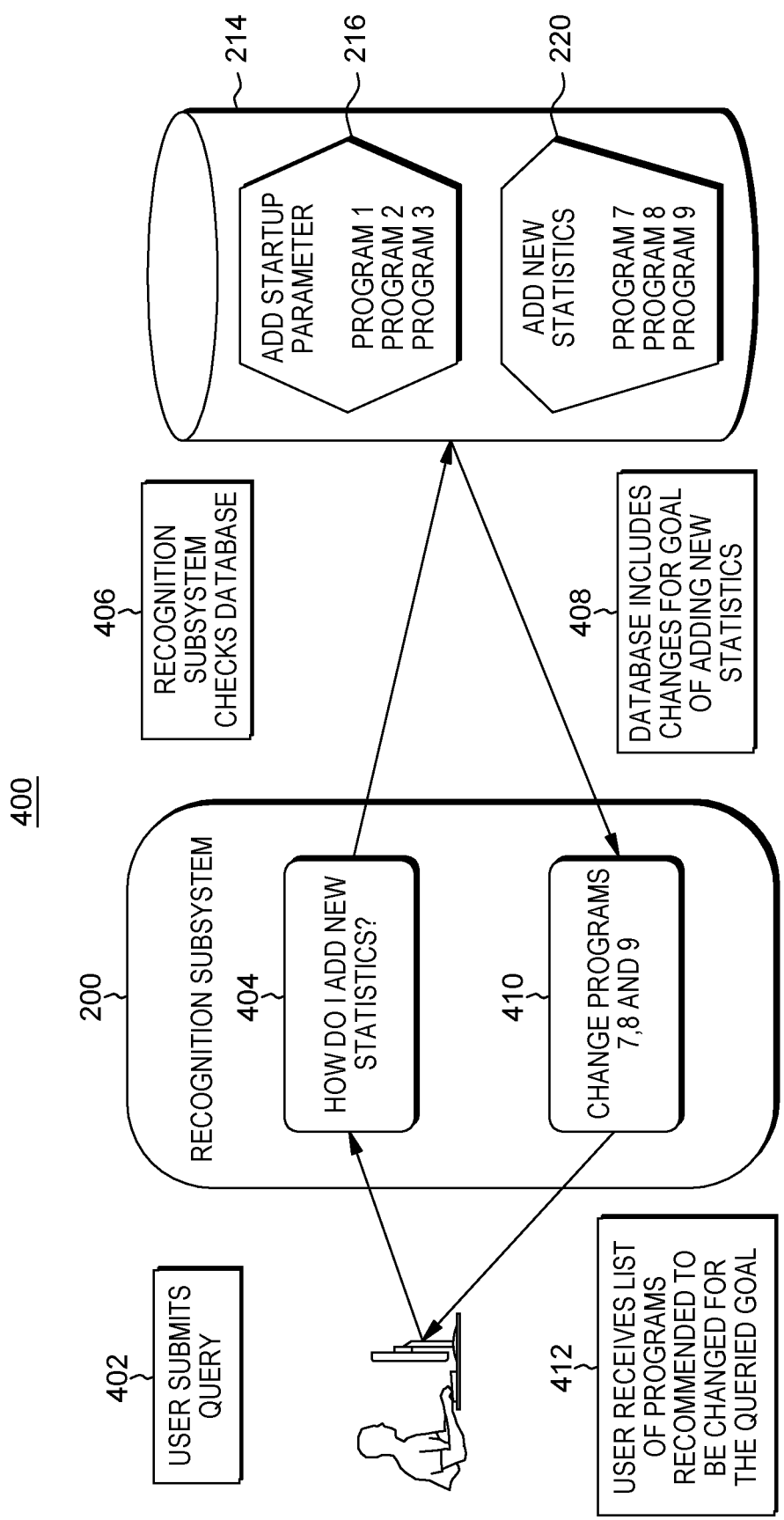
FIG. 4 is a flow chart of a method for responding to a user query using a recognition sub-system perform cognitive identification of related code changes in accordance with some aspects of the present disclosure.

With reference now to FIG. 4, a method 400 for identifying and presenting to a user a list of programs that may require changes for a particular goal is illustrated. In method 400, recognition sub-system 200 may be utilized to propose or provide the user with the list of programs in response to a query received from the user, e.g., via computing device 110. For example, at 402, the user may input a query 404 into an input device 120 of computing device 110 and the query 404 may be received by recognition sub-system 200. In some aspects, the query 404 may identify a goal of the user, e.g., how to add a new statistics. In some aspects, the query may be generated as part of the RTC story where, for example, the RTC story may be analyzed as described above to extract a goal and the extracted goal may be input as the query to recognition sub-system 200.

At 406, recognition sub-system 200 analyzes the query 404 and searches the database 214 for a pattern corresponding to the goal. For example, recognition sub-system may use natural language processing, key-word searching, string parsing or any other manner of analysis to determine a goal of the user from the query 404. In some aspects, for example, the query 404 may include a field identifying the goal. For example, the user may be presented with a drop-down list of available goals that have corresponding patterns in the data repository 150 via display 118 and the user may select a goal from the drop-down list for use in the query 404.

At 408, recognition sub-system 200 receives pattern 220 from database 214 corresponding to the goal of the query, e.g., adding new statistics.

At 410, recognition sub-system 200 extracts the list of programs 410 from the pattern 220, e.g., programs 7, 8, and 9, and transmits the list of programs to the computing device 110 associated with the user in response to the query.

At 412, the list of programs is received by the computing device 110 and presented to the user, e.g., via display 118, as a list of programs required or recommended to be changed to achieve the queried goal. This process enables a user who is unfamiliar with the architecture and details of the software package to identify and determine which modules may need to be changed to meet a particular goal.

Figure 5:
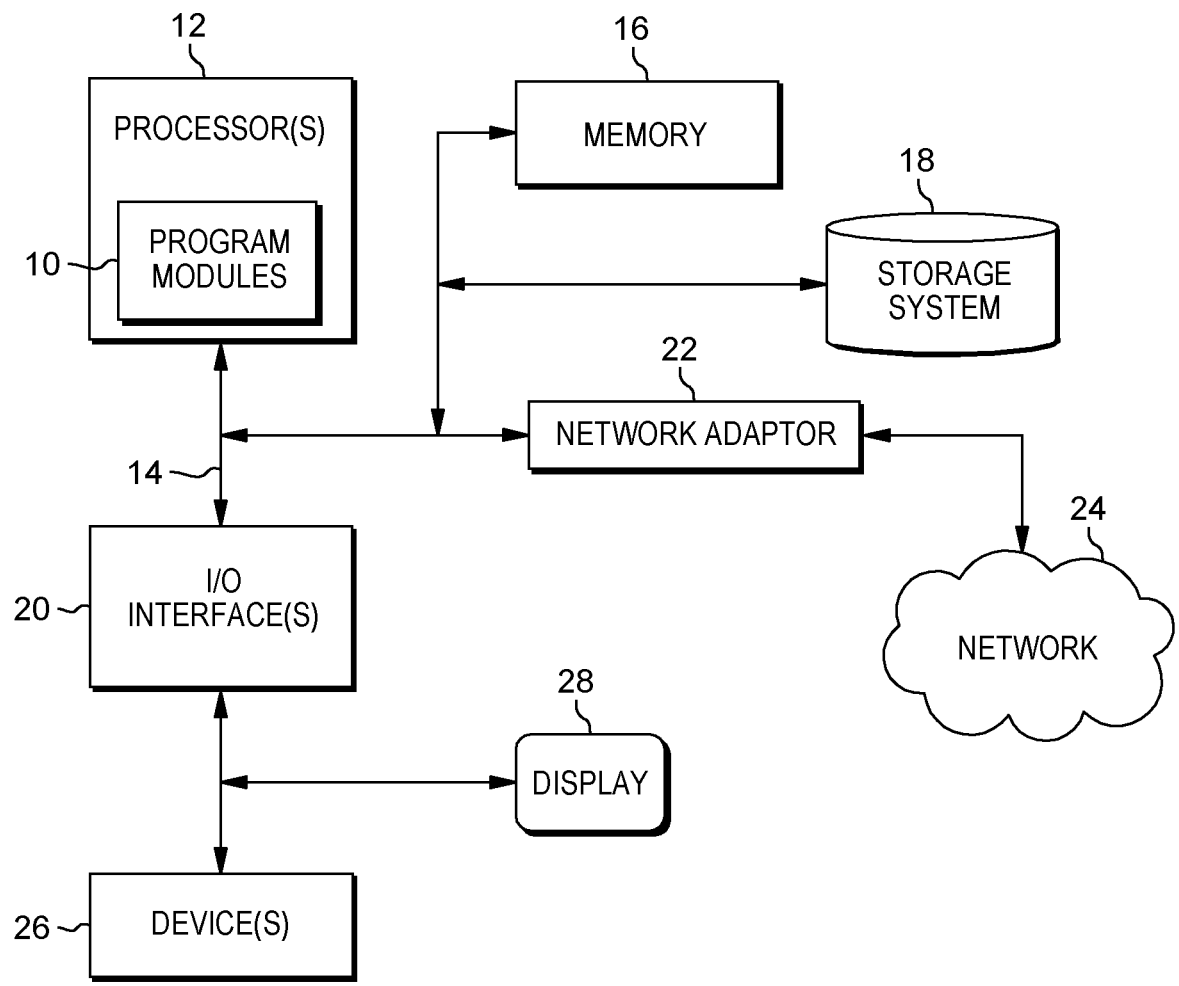
FIG. 5 is an exemplary block diagram of a computer system in which processes involved in the system, method, and computer program product described herein may be implemented.

FIG. 5 illustrates a schematic of an example computer or processing system that may implement any portion of system 100, computing device 110, data repository 150, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for identifying software related code changes based on a set of changes to achieve a goal, the method being implemented by at least one processor comprising hardware, and the method comprising:
   receiving a set of changes for a software package, the set of changes including particular changes made to a first set of programs;
   analyzing data associated with the set of changes to identify a goal achievable by making the set of changes, wherein the goal comprises at least one of:
   an addition of at least one parameter; and
   an addition of at least one statistic;
   querying a data repository for a pattern associated with the identified goal, wherein the pattern includes a second set of programs that are commonly changed to achieve the identified goal;
   receiving, from the data repository, the pattern associated with the identified goal;
   comparing the first set of programs with the second set of programs of the pattern;
   determining, based on the comparison, that at least one program among the second set of programs is absent from the first set of programs, wherein the absence of the at least one program from the first set of programs indicates a need to make the particular changes to the at least one program absent from the first set of programs;
   transmitting, based on the determining, a message to a computing device associated with a user, the message indicating that the particular changes to the at least one program is not among the received set of changes; and
   in response to a pre-determined threshold number of the received set of changes being different from a known pattern, generating, based on the determining, a new pattern for the goal under a pre-defined naming criteria.

2. The method of claim 1, wherein the data associated with the set of changes comprises a work item that triggered the set of changes, and wherein analyzing the data comprises analyzing a text of the work item to identify the goal.

3. The method of claim 1, wherein the data associated with the set of changes comprises documentation within the at least one program of the set of changes, and wherein analyzing the data comprises analyzing a text of the documentation to identify a goal of the set of changes.

4. The method of claim 1, wherein analyzing the data associated with the set of changes comprises performing natural language processing on a text of the data.

5. The method of claim 1, further comprising:
   determining, based on the comparison, that the set of changes includes changes to at least one program among the first set of programs that are absent from the second set of programs; and
   identifying the at least one program absent from the second set of programs as at least one specific program for the set of changes; and
   adding the common programs among the first and second sets of programs, and the at least one specific program, to the data repository in association with the set of changes.

6. The method of claim 1, wherein the pattern is uniquely associated with the software package.

7. The method of claim 1, wherein the at least one program is a file including at least one line of code.

8. A method for identifying software related code changes based on a set of changes to achieve a goal, the method being implemented by at least one processor comprising hardware, and the method comprising:
   receiving a set of changes for a software package, the set of changes including changes made to a plurality of programs;
   comparing the plurality of programs with a plurality of patterns stored in a data repository and associated with the software package, wherein each pattern includes a respective set of programs that were commonly changed to achieve a respective goal, and each respective goal comprises one of:
   an addition of at least one parameter; and
   an addition of at least one statistic;
   identifying, based on the comparison, a pattern among the plurality of patterns that includes a set of programs that matches the plurality of programs in the set of changes;
   comparing at least one program included in the matching pattern to the plurality of programs;
   determining, based on the comparison, whether the match is a complete match;

in a case where it is determined that the match is a complete match, implementing the set of changes in the software package; and in a case where it is determined that the match is not a complete match, transmitting a message to a computing device associated with a user that submitted the set of changes, the message indicating that the match is not a complete match, wherein the failure of a complete match indicates a need to implement the set of changes to programs among the identified pattern that are absent from the plurality of programs; and in response to a pre-determined threshold number of the received set of changes being different from a known pattern, generating, based on the determining, a new pattern for the each respective goal under a pre-defined naming criteria.

9. The method of claim 8, wherein comparing the set of changes to the plurality of patterns comprises comparing a list of the plurality of programs of the set of changes with a list of programs included in each of the patterns.

10. The method of claim 9, wherein identifying, based on the comparison, the pattern in the plurality of patterns that matches the set of changes comprises determining a proportion of the list of programs included in the pattern that are also included in the list of the plurality of programs of the set of changes.

11. The method of claim 10, wherein the determined proportion is compared to a pre-determined threshold value, and wherein identifying, based on the comparison, the pattern in the plurality of patterns that matches the set of changes comprises determining that the determined proportion is greater than the pre-determined threshold value.

12. The method of claim 8, wherein determining that the match is a complete match comprises determining that every program included in the pattern is also changed in the set of changes.

13. The method of claim 8, wherein the message includes an identification of at least one program included in the pattern that is not included in the plurality of programs changed by the set of changes.

14. The method of claim 8, wherein in response to determining that the match is a complete match, the method further comprises transmitting a message to the computing device associated with the user that submitted the set of changes, the message indicating that the match is a complete match.

15. The method of claim 8, wherein the pattern is uniquely associated with the software package.

16. The method of claim 8, wherein the plurality of programs are files each including at least one line of code.

17. A system comprising:
a memory configured to store a software package;
a processor configured to be in communication with the memory, the processor being configured to:

receive a set of changes for the software package, the set of changes including particular changes made to a first set of programs;

analyze data associated with the set of changes to identify a goal achievable by making the set of changes, wherein the goal comprises at least one of:
an addition of at least one parameter; and
an addition of at least one statistic;

query a data repository for a pattern associated with the identified goal, wherein the pattern includes a second set of programs that are commonly changed to achieve the identified goal;

receive, from the data repository, the pattern associated with the identified goal;

compare the first set of programs with the second set of programs of the pattern;

determine, based on the comparison, that at least one program among the second set of programs is absent from the first set of programs, wherein the absence of the at least one program from the first set of programs indicates a need to make the particular changes to the at least one program absent from the first set of programs;

transmit, based on the determining, a message to a computing device associated with a user, the message indicating that the particular changes to the at least one program is not among the received set of changes; and in response to a pre-determined threshold number of the received set of changes being different from a known pattern, generate, based on the determining, a new pattern for the goal under a pre-defined naming criteria.

18. The system of claim 17, wherein the processor is further configured to:
determine based on the comparison, that the set of changes includes changes to at least one program among the first set of programs that are absent from the second set of programs; and identify the at least one program absent from the second set of programs as at least one specific program for the set of changes; and add the common programs among the first and second sets of programs, and the at least one specific program, to the data repository in association with the set of changes.

19. The system of claim 17, wherein the pattern is uniquely associated with the software package.

20. The system of claim 17, wherein the processor is further configured to perform natural language processing on a text of the data to analyze the data associated with the set of changes.

* * * * *